United States Patent [19]

Pierson et al.

[11] Patent Number: 4,955,555
[45] Date of Patent: Sep. 11, 1990

[54] LEADER-RETRACTING FILM MAGAZINE AND METHOD FOR ENCLOSING FILM

[75] Inventors: Charles W. Pierson, Rochester; Frederick F. Tone, Holley, both of N.Y.

[73] Assignee: Eastman Kodak Company, Rochester, N.Y.

[21] Appl. No.: 547,310

[22] Filed: Oct. 31, 1983

[51] Int. Cl.$^5$ .............................................. B65H 75/28
[52] U.S. Cl. ................................................... 242/74
[58] Field of Search ........................ 242/74, 71.1, 71.7, 242/58.5, 58.1, 58.4, 73, 74, 74.1, 125

[56] References Cited

U.S. PATENT DOCUMENTS

| | | | |
|---|---|---|---|
| 2,792,185 | 5/1957 | Julliard | 242/74 |
| 3,003,712 | 10/1961 | Dalton | 242/74 |
| 3,481,552 | 12/1969 | Gersch et al. | 242/71.1 |
| 3,497,050 | 2/1970 | Landgraf | 242/74 |
| 3,756,528 | 9/1973 | Ohmura | 242/74 |
| 3,910,516 | 10/1975 | Hoffacker et al. | 242/56 R |
| 4,061,286 | 12/1977 | King, Sr. et al. | 242/58.4 X |
| 4,145,133 | 3/1979 | Wareham | 242/71.1 X |
| 4,378,913 | 4/1983 | Fohl | 242/74 |
| 4,398,679 | 8/1983 | Kluczynski et al. | 242/74 |

FOREIGN PATENT DOCUMENTS 861503 1/1953 Fed. Rep. of Germany ........ 242/74

Primary Examiner—Harvey C. Hornsby
Assistant Examiner—Scott J. Haugland
Attorney, Agent, or Firm—Charles E. Snee, III

[57] ABSTRACT

A film magazine is disclosed which comprises a light-tight casing and a spool rotatable therein. A leader has one end attached to the spool and extends outside the casing for splicing to light-sensitive film. The splice is retracted into the casing during spooling operations, and means are provided to prevent the splice between the film and the leader from being pulled from the magazine.

10 Claims, 2 Drawing Sheets

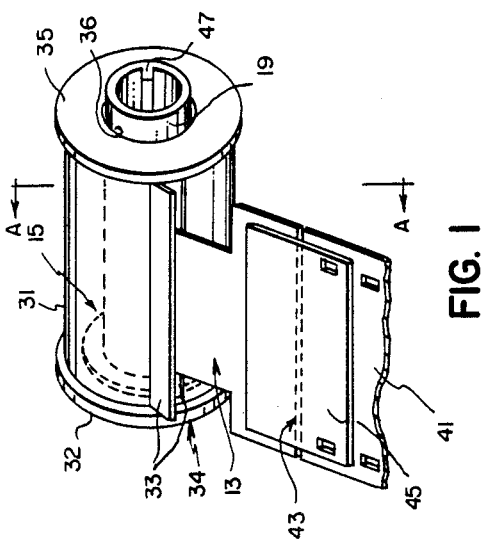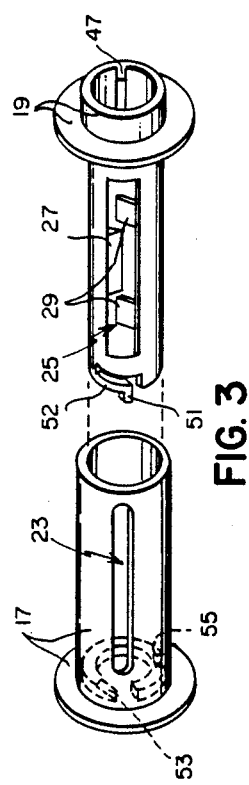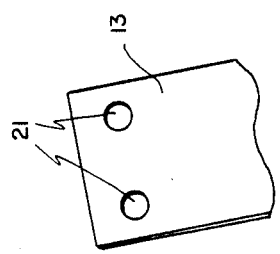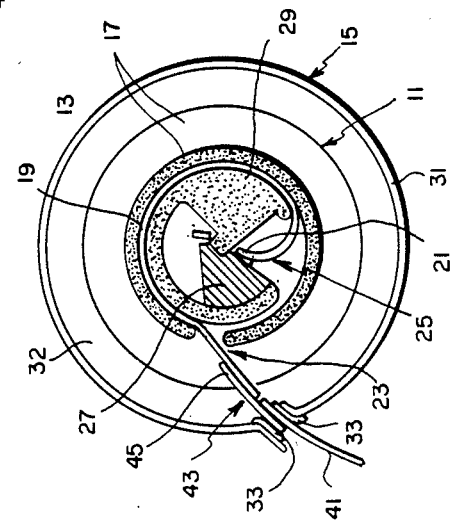

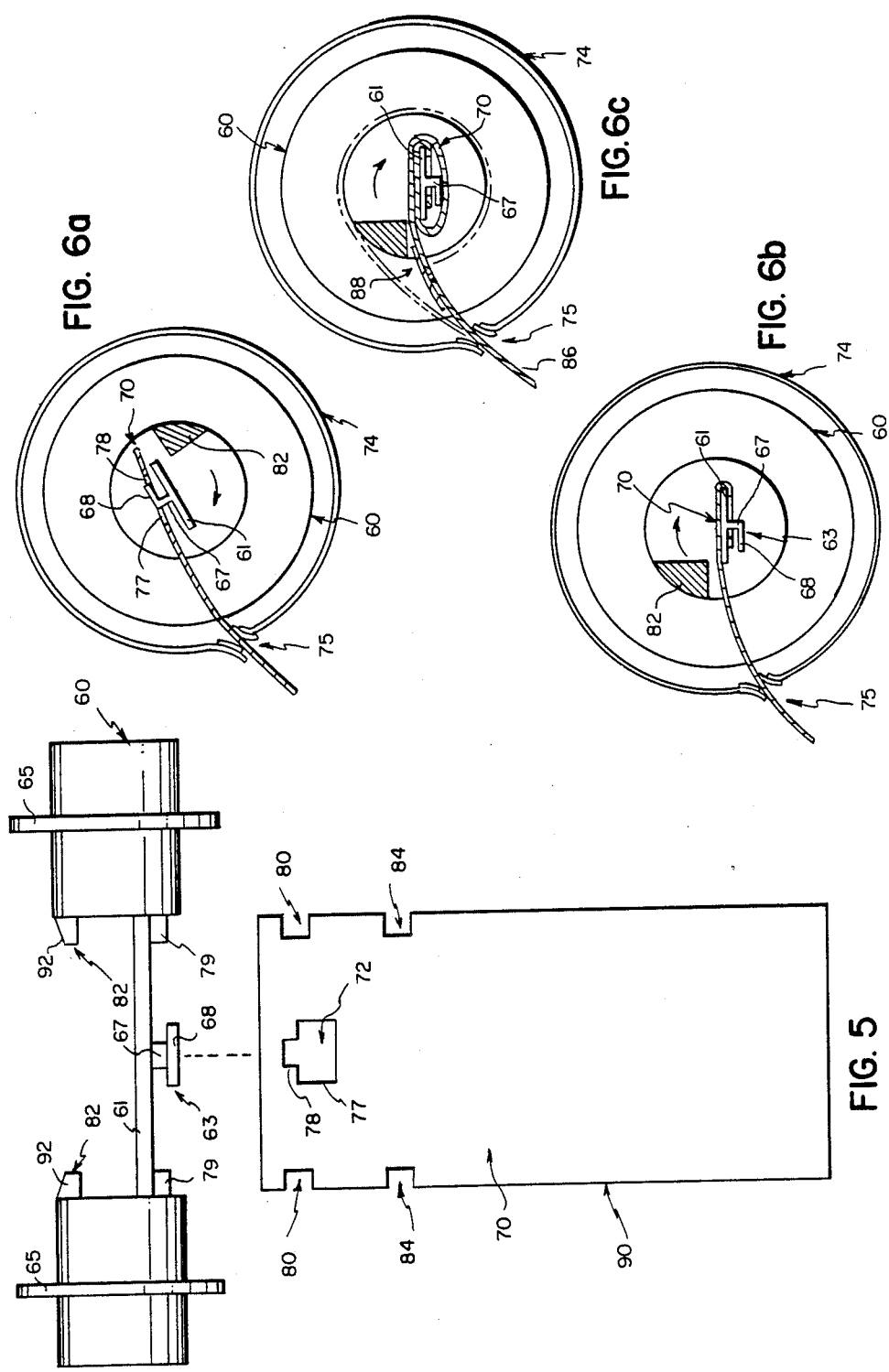

LEADER-RETRACTING FILM MAGAZINE AND METHOD FOR ENCLOSING FILM

BACKGROUND OF THE INVENTION

1. Field of the Invention

The present invention relates generally to a magazine for use with light-sensitive film, and more specifically to a method of attaching film to the spool of such a magazine.

2. Description of the Prior Art

Many methods have been devised for attaching film to a spool in a magazine casing. The practice of first attaching a short leader to a spool, sealing the spool in a casing with the leader extending out of the casing and, thereafter, splicing sensitized film onto the leader and winding the leader and film onto the spool is well-known. Use of such a leader permits assembling the magazine off-line from film spooling operations, and under room-light conditions. Further, spooling operations can be speeded up since attachment of film to a leader is faster than attachment to the spool.

The practice of using a leader in such film magazines has generally been considered unacceptable, however, because the splice made between the leader and the film may interfere with photofinishing operations. High-speed photofinishing requires that customers' films be cut from their magazines and spliced end-to-end to form a continuous web. If the end of the film cut from the magazine carries part of the splice that attached the film to the leader, a new splice that the photofinisher makes on that end will be thicker than normal because of the addition of another layer of tape. This extra thickness may snag in the photofinisher's equipment. Such splices are also weaker and, irrespective of their thickness, are perhaps more likely to separate since they are, in effect, double splices.

In addition to the photofinishing problems there is also a camera design problem. Some cameras expose film very close to the magazine's film exit slot. In such cameras a splice emerging from the magazine will cause loss of the image at the last frame. For these reasons, the practice of using a leader for loading unexposed photographic film has been considered unacceptable.

SUMMARY OF THE INVENTION

In accordance with the present invention a magazine for light-sensitive film includes a light-tight casing with a film exit slot and a spool rotatably mounted in the casing. A leader is attached to a portion of the spool and extends through the slot for splicing to the film. Rotation of the spool portion in the casing retracts the splice into the casing. Means are provided for retaining the leader wound about the spool portion to inhibit pulling the splice out of the casing.

By the present invention I have provided a convenient means and method for using a leader for loading a magazine with light-sensitive film. Retracting and retaining the splice within the magazine prevents the splice from being within the last image on the film and prevents it from interferring with photofinishing operations.

The invention, its objects and advantages, will become more apparent when the detailed description of the embodiments presented below is considered in conjunction with the accompanying drawings.

BRIEF DESCRIPTION OF THE DRAWINGS

In the detailed description of the preferred embodiment of the invention presented below, reference is made to the accompanying drawings in which:

FIG. 1 is a perspective view of a magazine in accordance with a first embodiment of the present invention before the leader is retracted;

FIG. 2 is a cross section view of the magazine taken at line A—A in FIG. 1, but showing the magazine after the leader is retracted;

FIG. 3 is an exploded view of the spool of the magazine shown in FIG. 1;

FIG. 4 is a view of one end of a leader in accordance with the first embodiment of the present invention;

FIG. 5 is a plan view of a spool and leader in accordance with another embodiment of the present invention; and FIGS. 6A, 6B and 6C are a series of cross section views of the magazine shown in FIG. 5.

DETAILED DESCRIPTION OF THE PREFERRED EMBODIMENTS

FIGS. 1, 2 and 3 show a magazine comprising a spool 11, a leader 13, and a light-tight casing 15. Spool 11 is best seen in FIG. 3 and comprises an outer section 17 and a coaxial inner section 19. Inner section 19 is rotatable within outer section 17, as explained below in greater detail. Outer section 17 has a slot 23, and inner section 19 has a similar slot 25 with an aligned tab 27 and hooks 29 molded inside slot 25.

FIG. 4 is a detail drawing of a first end of leader 13. Two holes 21 are punched in the leader end, which is inserted through slots 23 and 25 in spool sections 17 and 19, respectively. As leader 13 enters slot 25, tab 27 forces the leader down, so that hooks 29 enter holes 21. Since the attachment of leader 13 to spool 11 does not entail light-sensitive film, it can be carried out in ordinary white light. This simplifies the operation and permits visual, non-destructive inspection.

After leader 13 is attached to spool 11, the spool is axially inserted into a barrel 31 of casing 15 with an end of outer spool section 17 extending outside barrel 31 through a close-fitting opening (not shown) in an end cap 32 of the casing. Leader 13 is simultaneously inserted between two pieces of conventional black velvet plush 33 lining film exit slot 34 in barrel 31. The plush light-locks slot 34. An end cap 35 is crimped onto barrel 31 to seal casing 15, leaving an end of inner spool section 19 extending out of the casing through a close-fitting opening 36 in end cap 35.

The magazine is now ready for splicing on and spooling of light-sensitive film 41, and the assembled magazine is removed to a dark area. In the spooling operation, a splice 43 between film 41 and leader 13 is made with tape 45 as shown in FIG. 1. Torque is then applied to a drive tang 47 on the portion of inner section 19 extending through opening 36, while casing 15 and outer spool section 17 are held stationary. As inner section 19 rotates through 270°, a portion of leader 13 is wound on inner section 19, and splice 43 is retracted into casing 15, as shown in FIG. 2. A pin 51 on resilient arm 52 rides up a cam 53 and falls into a notch 55 (FIG. 3) to prevent further rotation of inner section 19 in either direction relative to outer section 17. Thus, tape 45 of splice 43 is prevented from being pulled from casing 15 by a camera or by photofinishing equipment. Further rotation of inner section 19 rotates the entire spool 11 relative to casing 15, whereby film 41 is wound about outer section 17 inside the casing.

In apparatus in accordance with a second embodiment, shown in FIG. 5, a spool 60 includes two ends connected by an eccentric flattened bar 61. A hook 63 is positioned on the bar midway between a pair of flanges 65. Hook 63 has a stem 67 and a blade 68, the former being the narrower of the two. Leader 70, in accordance with this embodiment, has a keyhole opening 72 and notch pairs 80 and 84 as illustrated.

During assembly of the magazine, the spool is axially inserted in a barrel and an end cap crimped on the open end, as in the first embodiment. In the second embodiment, however, the leader is attached after the spool is sealed in the casing. The end of leader 70 having opening 72 is inserted into casing 74 through a plush-lined slot 75 so that the wider portion 77 of opening 72 slides over blade 68 onto stem 67 of hook 63 (FIG. 6A). The spool is then rotated 180°, to the position shown in FIG. 6B. As the spool rotates, stem 67 slides into the narrower portion 78 of opening 72 and a pair of lock ridges 79 on bar 61 are pressed into first notch pair 80 in each lateral edge of leader 70. Subsequently, detents 82 on spool 60 near either end of bar 61 are pressed through second notch pair 84 as the leader 70 is wrapped around bar 61.

The assembled magazine is then inspected and removed to a dark area for film spooling. In the spooling operation, sensitized film 86 is spliced onto leader 70 with tape 88, and spool 60 is then rotated to wind the film on the spool. When spool 60 rotates from the position shown in FIG. 6B to the position shown in FIG. 6C, splicing tape 88 is retracted into casing 74, and the unindented edges 90 of leader 70 are pressed against the sloped faces 92 of detents 82, and edges 90 snap past the detents onto the portion of leader 70 already wrapped on bar 61. Detents 82 then prevent the leader from being unwrapped from bar 61, which prevents splicing tape 88 from being pulled from casing 74 by a camera or by photofinishing equipment.

Although the invention has been described with particular reference to a presently preferred embodiment thereof, it will be readily understood that variations and modifications can be effected within the spirit and scope of the invention as described hereinabove and as defined in the appended claims. For example, the leader may be attached to the spool with tape. Furthermore the film may be secured to the leader by a heat or solvent splice, or by other suitable means.

I claim:

1. A magazine for light-sensitive film, said magazine comprising:
   a casing having a light-tight slot through which film may exit said casing;
   a spool rotatably mounted in said casing;
   a leader extending through said slot, said leader having a first end inside said casing attached to at least a portion of said spool and a second end outside said casing adapted to be attached outside said casing by a splice to the film so that rotation of said spool portion relative to said casing winds said leader about said spool portion, whereby the splice is retracted into said casing; and
   means for retaining said leader wound about said spool portion to inhibit pulling the splice out of said casing, whereby said leader is inhibited from being withdrawn from within said casing.

2. A magazine for light-sensitive film as claimed in claim 1 wherein:
   said spool comprises inner and outer coaxial sections, said inner section having said leader attached thereto and being adapted to rotate within said outer section to wind at least a part of said leader thereon; and
   said means for retaining said leader comprises means for inhibiting rotation of said inner section after said leader part is wound thereon, whereby said leader part is retained on said inner section.

3. A magazine for light-sensitive film as claimed in claim 1 wherein said means for retaining said part comprises a detent affixed to said spool, said detent being adapted to engage an edge of said leader after being wound about said spool portion, whereby said leader is retained on said spool.

4. A magazine loaded with a light-sensitive film, said magazine comprising:
   a casing having the film extending through a light-tight slot in said casing;
   a spool rotatably mounted in said casing, said spool having the film partially wound thereon;
   a leader wound about at least a portion of said spool, said leader having a first end attached to said spool portion and a second end attached to the film by a splice, and having sufficient length for the splice to exit the casing if said leader completely unwound; and
   means for retaining a part of said leader wound about said spool portion to inhibit pulling said splice and any of said leader out of said casing.

5. A magazine loaded with a light-sensitive film as claimed in claim 4 wherein:
   said spool comprises inner and outer coaxial sections, said inner section having said leader attached thereto and said part of said leader wound thereon, and
   said means for retaining said part comprises means for inhibiting rotation of said inner section relative to said outer section in a leader-unwinding direction.

6. A magazine loaded with a light-sensitive film as claimed in claim 4 wherein said means for retaining said part comprises a detent affixed to said spool, said detent being adapted to engage an edge of said leader, whereby said leader is retained on said spool.

7. A method of enclosing light-sensitive film in a light-tight casing, said method comprising the steps of:
   attaching a first end of a leader to at least a portion of the spool;
   axially inserting the spool into the casing with a second end of the leader extending outside the casing through a slot in the casing;
   splicing the film to a second end of the leader;
   rotating the spool portion so that a part of said leader is wound on the spool portion, whereby the splice is retracted into the casing; and
   retaining the part of the leader wound on the spool portion to inhibit the spice and any of said leader out of the casing.

8. A method of enclosing a light-sensitive film in a light-tight casing as claimed in claim 7 wherein said portion is retained on the spool by engaging each edge of the leader with a detent affixed to the spool.

9. A method of enclosing light-sensitive film in a light-sensitive casing, said method comprising the steps of sequentially:

attaching a first end of a leader to the inner section of a spool having inner and outer coaxial sections;

axially inserting the spool into the casing with a second end of the leader extending outside the casing through a slot in the casing;

splicing the film to a second end of the leader;

rotating the inner section of the spool relative to the outer section so that a part of the leader is wound of the inner section, whereby the splice is retracted into the casing; and inhibiting rotation of the inner spool section relative to the outer section in a leader-unwinding direction, whereby the splice and any of said leader are retained in the casing.

10. A method of loading light-sensitive film into a magazine having a light-tight casing, a spool rotatably mounted in the casing, and a leader extending through a slot in the casing and attached to at least a portion of the spool, said method comprising the steps of:

forming a splice between the film and the end of the leader outside the casing;

rotating the spool portion so that a part of the leader is wound on the spool portion, whereby said splice is retracted into the casing; and retaining said part of the leader on the spool portion to inhibit pulling said splice and any of said leader out of the casing.

* * * * *